United States Patent
Parente et al.

(10) Patent No.: US 7,422,761 B2
(45) Date of Patent: Sep. 9, 2008

(54) IN-LINE PROCESS FOR PREPARING CALCIUM-SUPPLEMENTED JUICE BEVERAGES

(75) Inventors: Juliana Parente, Bradenton, FL (US); Craig Philipp, Bradenton, FL (US); Stephen A. Letourneau, Holmes Beach, FL (US); Marcelo Perez, Bradenton, FL (US)

(73) Assignee: Tropicana Products, Inc., Bradenton, FL (US)

( * ) Notice: Subject to any disclaimer, the term of this patent is extended or adjusted under 35 U.S.C. 154(b) by 474 days.

(21) Appl. No.: 10/727,128

(22) Filed: Dec. 3, 2003

(65) Prior Publication Data

US 2005/0123650 A1    Jun. 9, 2005

(51) Int. Cl.
*A23L 1/304* (2006.01)

(52) U.S. Cl. ............ 426/74; 426/330.3; 426/519; 426/590; 426/599

(58) Field of Classification Search ............ 426/74, 426/599, 590, 330.3, 519
See application file for complete search history.

(56) References Cited

U.S. PATENT DOCUMENTS

| | | | |
|---|---|---|---|
| 4,738,856 A | 4/1988 | Clark | |
| 4,740,380 A | 4/1988 | Melachouris et al. | |
| 4,851,221 A | 7/1989 | Pak et al. | |
| 4,871,534 A | 10/1989 | Montgomery | |
| 4,871,554 A | 10/1989 | Kalala et al. | |
| 4,992,282 A | 2/1991 | Mehansho et al. | |
| 5,186,965 A | 2/1993 | Fox et al. | |
| 5,225,221 A | 7/1993 | Camden et al. | |
| 5,422,128 A | 6/1995 | Burkes et al. | |
| 5,468,506 A | 11/1995 | Andon | |
| 5,474,793 A | 12/1995 | Meyer et al. | |
| 5,500,232 A | 3/1996 | Keating | |
| 5,597,595 A | 1/1997 | DeWille et al. | |
| 5,817,351 A | 10/1998 | DeWille et al. | |
| 5,834,045 A | 11/1998 | Keating | |
| 5,837,045 A | 11/1998 | Johnson et al. | |
| 5,851,578 A | 12/1998 | Gandhi | |
| 6,077,557 A | 6/2000 | Gordon et al. | |
| 6,086,927 A | 7/2000 | Frielich et al. | |
| 6,096,927 A | 8/2000 | Parikh et al. | |
| 6,106,874 A | 8/2000 | Liebrecht et al. | |
| 6,235,322 B1 | 5/2001 | Lederman | |

(Continued)

FOREIGN PATENT DOCUMENTS

DE    297 19 136 U 1    2/1998

(Continued)

*Primary Examiner*—Helen F Pratt
(74) *Attorney, Agent, or Firm*—Banner & Witcoff, Ltd

(57) ABSTRACT

A process is provided for fortifying a juice beverage with calcium. Fruit juices, including citrus juices, can be fortified. Serial in-line mixers deposit sources of calcium and acid separately into a flow of the juice. An upstream in-line mixer adds a calcium source to the juice flow, such as by high-shear mixing. A downstream in-line mixer adds a food-grade acid powder, such as by high-shear mixing, to the flow of juice into which the calcium had been incorporated. The calcium and acid sources combine within the juice to provide a calcium-fortified juice within which the calcium exhibits excellent solubility and good sensory characteristics, when each property is compared with a successful commercial process for calcium fortification of juices.

28 Claims, 2 Drawing Sheets

U.S. PATENT DOCUMENTS

| | | |
|---|---|---|
| 6,261,610 B1 | 7/2001 | Sher et al. |
| 6,319,490 B1 | 11/2001 | Parker |
| 6,413,561 B1 | 7/2002 | Sass et al. |
| 6,436,446 B1 | 8/2002 | Forusz et al. |
| 6,444,252 B1 | 9/2002 | Gordon et al. |
| 6,461,650 B1 | 10/2002 | Remesy |
| 6,475,539 B1 | 11/2002 | DeWille et al. |
| 6,569,477 B2 | 5/2003 | Lederman |
| 6,730,337 B2 | 5/2004 | Hutt et al. |
| 7,052,725 B2 * | 5/2006 | Chang et al. ............ 426/74 |
| 2001/0018082 A1 | 8/2001 | Fox |
| 2001/0051197 A1 | 12/2001 | Yang et al. |
| 2002/0022078 A1 | 2/2002 | Gordon et al. |
| 2002/0102331 A1 | 8/2002 | Chang et al. |
| 2002/0122866 A1 | 9/2002 | Palaniappan et al. |
| 2002/0146486 A1 | 10/2002 | Yang et al. |
| 2003/0059499 A1 | 3/2003 | Bouman et al. |
| 2003/0068408 A1 | 4/2003 | Lederman |

FOREIGN PATENT DOCUMENTS

| | | |
|---|---|---|
| EP | 0 244 903 A1 | 11/1987 |
| EP | 0350523 | 1/1990 |
| EP | 0634110 | 1/1995 |
| JP | 54008767 | 6/1977 |
| JP | 2119761 | 5/1990 |
| WO | WO 02/089610 | 11/2002 |
| WO | WO 03/024250 | 3/2003 |
| WO | WO 2004/077964 | 9/2004 |

* cited by examiner

IN-LINE PROCESS FOR PREPARING CALCIUM-SUPPLEMENTED JUICE BEVERAGES

BACKGROUND OF THE INVENTION

1. Field of the Invention

This invention generally relates to an in-line process for preparing calcium-supplemented not-from-concentrate juice beverages. The invention relates more particularly to incorporating a calcium source and then incorporating an edible acid source into a flow of juice. Preferably, the calcium source is added by way of an upstream in-line mixer, and the acid source is added by way of an in-line mixer downstream of the in-line mixer.

2. Description of Related Art

Calcium addition to beverages has been recognized for many years as advantageous and desirable. Literature and patents have extolled virtues of calcium within fruit juices for a wide variety of reasons. Typically, these attribute one or more health benefits to supplementing fruit juices with calcium. For example, calcium-supplemented fruit juices can provide a valuable calcium source for individuals who are not able to consume adequate quantities of dairy products. Examples of the patent art relating to calcium within non-dairy beverages include the following.

Melachouris, et al. U.S. Pat. No. 4,740,380 is directed to clear beverages and requires heating of the beverage after calcium addition. Organic calcium sources are used, and organic acids can be included to adjust the pH of the beverage, whereby this reference purports, the organic calcium source first is solubilized, followed by the pH adjustment.

Meyer et al. U.S. Pat. No. 5,474,793 specifically teaches calcium-supplemented juice preparation by first preparing an acidified juice stream, passing this stream through a turbulence-creating mixing zone, and adding a calcium source to this acidified juice stream. Camden et al. U.S. Pat. No. 5,225,221 prepares calcium-supplemented fruit juice beverages by homogeneously dispersing a calcium hydroxide slurry in a pasteurized or sterilized fruit juice stream. Any further pasteurization or sterilization of the calcium-supplemented fruit juice beverage is avoided.

U.S. Pat. No. 5,855,936 (Reddy, et al.), U.S. Pat. No. 6,039,986 (Mallangi et al.), and U.S. Pat. No. 6,261,610 (Sher et al.) each describe fortification which can include acidification of a calcium source. These patents teach incorporating a variety of different organic and/or gum types of components in order to achieve the effects desired by these patents.

Freilich et al. U.S. Pat. No. 6,086,927 teaches preparing calcium enriched food products by a process which forms a mixture of calcium hydroxide and water or juice, and mixing a phosphorus-based acid with the calcium/juice blend in order to sufficiently neutralize the calcium hydroxide. Calcium lactate also is included in mixtures according to this patent. This can be followed by mixing with the calcium phosphate source. This is a multi-step complicated processing approach.

These references, and all references identified herein are incorporated by reference. In this regard, Meyer et al. for example discusses not-from-concentrate ("NFC") fruit juices, including the restrictions placed upon such juices, especially the fact that such juices, particularly NFC orange juices, cannot contain added water.

Furthermore, Meyer et al. is representative of art which clearly teaches that calcium supplementing of fruit juices, including NFC fruit juices, should first acidify the juice before adding the calcium source. According to art of this type, an acidified juice stream is subjected to a turbulent mixing zone, and a calcium source is added to this acidified juice turbulent mixing zone.

In general, the art does not teach a satisfactory approach for a non-complicated procedure for providing calcium-supplemented NFC juice. Less-than-satisfactory aspects of prior procedures include the need of such systems to require careful timing of additive addition and/or mixing duration, typically requiring addition on a batch basis and/or in stages.

Prior approaches, exemplified by patents and publications of The Procter & Gamble Company, teach the formation of a chemical complex generally identified as calcium citrate malate ("CCM"). Patents such as Meyer et al. and Camden et al., identified above, teach that one must incorporate into the juice a combination of added citric acid and malic acid in order to provide the desired calcium source which exhibits good solubility properties and reduced precipitation tendencies. Approaches such as these also are taught as being required for avoiding deterioration of the sensory qualities of the fruit juice, particularly of a calcium-fortified NFC fruit juice such as an NFC citrus juice.

Avoiding precision and timed addition requirements as noted above would positively enhance processing techniques. In addition, it would be advantageous if an approach were available that avoids the need to add three chemicals in order to prepare calcium-fortified NFC fruit juices, including calcium-fortified NFC orange juices.

SUMMARY OF THE INVENTION

In accordance with the present invention, a process is provided for preparing a calcium-supplemented not-from-concentrate fruit juice through an in-line addition approach. Whole juice is directed to flow through a conduit or other passageway which has in-line mixers positioned therealong. A calcium source is added into the juice stream through an upstream one of the in-line mixers. A food grade edible acid, such as a malic acid source, is added to the calcium-augmented juice stream by way of a downstream one of the in-line mixers. Each of the upstream and downstream in-line mixers imparts high-shear mixing conditions. The product outflow from this system is a calcium-fortified NFC juice with a calcium component that is very effectively solubilized.

A general object of the present invention is to provide a process for fortifying a not-from-concentrate fruit juice with calcium and calcium-fortified juice made thereby.

Another aspect or object of the present invention is to provide an improved calcium-fortification process for NFC juice supplies which utilizes separate in-line mixers for a calcium source and for a food-grade acid source.

Another aspect or object of this invention is to provide a process by which calcium and food-grade acid sources are added to a flow of NFC fruit juice by an approach during which the calcium and the acid are added to the juice stream at the same time and at different locations along the stream.

A further aspect or object of the present invention is a process that fortifies NFC juices with a calcium source in a manner that achieves a good calcium solubility.

Another aspect or object of this invention is an improved process for calcium fortification of citrus juices and calcium-fortified juices which do not exhibit significant differences in major sensory orange characteristics by trained panel sensory testing, while exhibiting significantly lower levels of certain off-flavor sensory characteristics.

Another object or aspect of the present invention is a process for calcium-fortification of NFC juices which allows for shorter blend times, positively affecting operations efficiency.

A further object or aspect of this invention is to form calcium phosphate material within a juice stream to prepare a fortified juice with a calcium source which is easily absorbed by the body, has no negative flavor attributes and/or is readily processed into the juice.

Another object or aspect of the invention is to provide a means for preparing a juice product having very high levels of calcium fortification.

Another object or aspect of the invention is to prepare calcium-fortified juices which have enhanced solubility and do not foul pasteurization equipment to the extent of CCM fortified juices.

Other aspects, objects and advantages of the present invention will be understood from the following description. The invention embodies these various elements in combinations as desired. The following description includes certain preferred embodiments of the present invention, relevant information concerning which is shown in the accompanying drawings.

DESCRIPTION OF THE PREFERRED EMBODIMENTS

Figure 1:
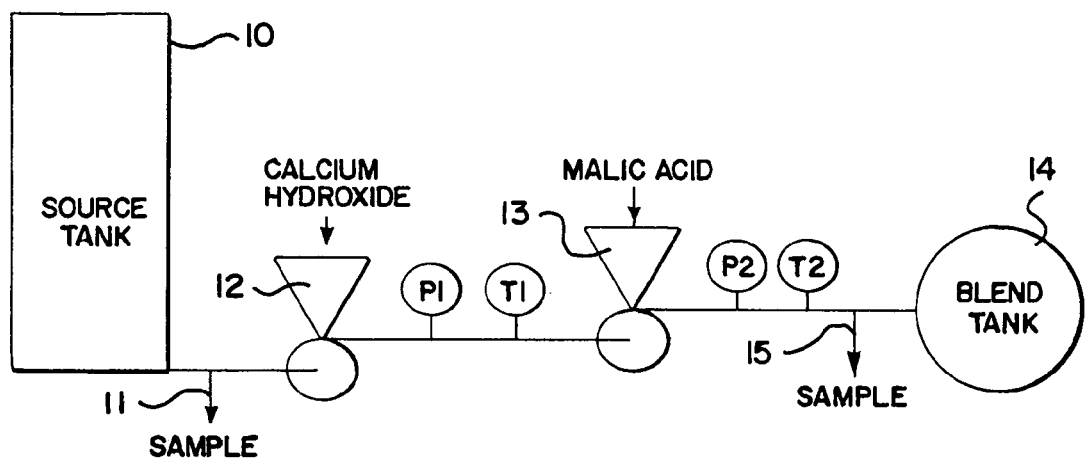
FIG. 1 is a process flow diagram illustrating a preferred embodiment of the invention.

The calcium-fortification process according to the invention incorporates in-line mixing technology in adding calcium to a juice flow. The invention is especially well-suited for calcium fortification of NFC juices, especially NFC citrus juices such as orange juice and grapefruit juice and blended NFC juices having a large proportion of orange juice or grapefruit juice.

Juices of this type are provided as a flow of juice. This flow of juice passes into and through serial in-line mixers. At least one of the in-line mixers adds a calcium source to the NFC juice flow. At least one other of the in-line mixers adds a food-grade acid to the NFC juice flow. In an important aspect of the invention, the in-line calcium addition is initiated before the food grade acid addition is initiated.

In the preferred embodiment, the calcium addition is completed before the food-grade acid addition is initiated. In this way, the calcium is well incorporated into the juice flow before the resulting calcium-augmented NFC juice flow passes into and through an in-line mixer which incorporates the food-grade acid. Exiting from this latter in-line mixer is a flow of calcium-fortified NFC juice.

The calcium-fortified flow of NFC juice which is formed by this sequence of component addition has sensory properties closely resembling those of NFC juices which are otherwise identical but which are fortified with calcium citrate malate (CCM) complexes such as those prepared according to U.S. Pat. No. 5,474,793 when an acidified juice stream first is formed by adding both citric and malic acid to a juice stream, after which a powdered calcium source then is added to the previously acidified juice stream. The present invention results in formation in the juice of a calcium component which may be a calcium compound, such as calcium malate or calcium phosphate. While not wishing to be bound by any specific theory, the present invention could result in the formation of a complex of calcium and edible acid originating cation(s), which can include free ion(s). The components of the present invention need not be the same as a complex that is formed when calcium fortification is carried out as in U.S. Pat. No. 5,474,793.

The make-up of the component of calcium and acid according to the invention is believed to be different from CCM as noted in the prior art, due in part to the simplified acid addition according to the invention. Rather than adding both citric acid and malic acid as a premix, the preferred embodiment of the invention refrains from the need to add citric acid to the juice flow, even when malic acid is the food grade acid source. Because there is no added citric acid, the actual complex formed need not be the same CCM complex formed by other processes and when both citric acid and malic acid are added to the juice. If any CCM might be formed, same will by at relatively very low levels. The component which is formed could be a complex which is partly CCM, formed due to the inherent citric acid levels in the juice itself prior to any additions.

With reference to the calcium source for the calcium addition according to the invention, such can include calcium salts available for use within food products. Examples include calcium hydroxide, calcium carbonate, calcium phosphate, calcium chloride, and calcium salts of organic acids such as calcium malate and calcium citrate.

With the present invention, when higher calcium Daily Values are desired, solubilized calcium levels are at least 0.15 weight percent of the calcium-fortified beverage, preferably at least about 0.27 weight percent. The calcium levels can be at and above 0.42 weight percent, which is approximately 100% of the Daily Value for calcium. These high calcium levels are achieved while maintaining good calcium solubility in the juice product for extended time periods.

The preferred calcium source is calcium hydroxide. On the basis of calcium hydroxide, the concentration of calcium source within the resulting calcium-fortified NFC juice is between about 3.5 and about 42 pounds (between about 1.6 and 19 kilograms). This calcium component content is based on calcium hydroxide and is based upon the density of a typical NFC orange juice. On the basis of calcium hydroxide, the calcium content can be between about 0.04 and about 0.5 weight percent. On a calcium basis, the calcium content can be between about 0.02 and about 0.25 weight percent. These weight percents are based on the total weight of the calcium fortified beverage. The calcium concentration is preferably between about 15 and 35 pounds of calcium hydroxide (between about 6.8 kilograms and about 15.9 kilograms) per 1,000 gallons (3785 liters) of fortified beverage, based upon the volume of the NFC juice prior to the addition of the calcium and acid.

The food grade acid component which is added to the calcium-augmented juice flow according to the invention is a food grade acid source. Exemplary acids in this regard include malic acid, phosphoric acid, fumaric acid, benzoic acid, adipic acid, gluconic acid, and lactic acid, and combinations of these. The preferred acid source is malic acid. The quantity of acid source within the NFC juice ranges between about 5 pounds and about 70 pounds (about 2.3 kilograms and about 31.7 kilogram) per 1,000 gallons of fortified beverage, based upon a malic acid content. This is between about 0.06 and 0.8 weigh percent, based on the total weight of the fortified beverage. A preferred range is between about 20 pounds and about 45 pounds (between about 9 kilograms and about 13.6 kilograms).

When calcium hydroxide and malic acid are the calcium and acid sources respectively, the ratio of calcium source to acid source is useful in achieving a Daily Value of calcium (DV per 240 milliliter serving). A suitable ratio is between about 1 to 2.7 calcium to acid and about 1 to 3.3 calcium to acid. A preferred range is between about 1 to 2.9 and 1 to 3.1 calcium to acid when added according to the process of the invention.

Flow rates are not limited to any range. Faster flow rates enhance efficiency as long as the in-line equipment can mix free of clumps. Flow rates available when the invention is practiced illustrate the speed and efficiency by which the serial in-line mixing preparation of the product of the invention can be achieved when desired. Addition of the calcium source is at a rate of between about 30 and about 450 pounds per minute (between about 13 kilograms per minute and about 222 kilograms per minute), on the basis of calcium hydroxide addition. This rate of calcium source in-line injection is within a full NFC juice moving at a rate of between about 150 gallons per minute and about 400 gallons per minute (between about 568 liters per minute and about 1514 liters per minute). Preferably, this flow is between about 250 gallons per minute and about 350 gallons per minute (between about 946 liters per minute and about 1325 liters per minute).

Regarding the flow rates of the acid source(s) which are achievable according to the invention, these are between about 100 pounds per minute and about 2000 pounds per minute (between about 45 kilograms per minute and about 907 kilograms per minute), based upon malic acid being the acid source.

In-line mixing flow rates as noted herein are achievable by a variety of commercially available in-line mixing units. These include APV® Triblender (APV Company Limited) in-line mixers and SILVERSON® (Silverson Machines LTD.) high shear mixers, as well as other high-shear, in-line mixers available from DYNASHER® (Admix, Inc.), Ross and others.

For purposes of illustration, with a typical in-line mixer, the calcium source or acid source, which typically are in granular or powdered form, are added at the in-line mixer through which the NFC juice is flowing. Rotor blades of the typical mixer subject these ingredients to high-speed rotation and can exert a powerful suction so as to draw liquid and solid materials into a rotor/stator assembly. Centrifugal force then drives materials toward the periphery of a mixer workhead where they are subjected to a milling action in a precision machined clearance between ends of the rotor blades and the inner wall of the stator. Intense hydraulic shear follows as the materials are forced, at high velocity, out through perforations in the stator to provide an outflow at this location.

Whatever precise in-line mixer mechanism or flow rates are used, it is important that turbulent mixing is achieved at the in-line mixers. The in-line mixers are high-shear and designed to incorporate solids into liquids. An example of a suitable range of shear is at least about 80,000 reciprocal seconds (1/sec). A typical range is between about 90,000 and about 130,000 1/sec., preferably between about 96,000 and about 120,000 1/sec.

The serial in-line mixers provide an operator advantage in that the calcium source addition and the juice source addition need not be timed by the operator. Instead, each source can be injected at the same time to respective in-line mixers. However, because the calcium addition is upstream of the acid addition within the common juice line, the juice flow "sees" calcium first and acid second as it travels downstream through the calcium-fortification system. This allows for simple, efficient and rapid addition of the sources of additives to the juice flow.

Addition of additive sources with this arrangement are also relatively rapid. Once the calcium source is injected into the NFC juice flow by an upstream in-line mixer, the length of time of juice flow before encountering acid source addition can be relatively short. This depends somewhat upon the design of the system, including variables such as conduit cross-sectional area, flow pressures and juice temperature. A typical range is between about 3 seconds and about 10 minutes.

The system allows for blending during a shorter overall time frame and more efficiently than heretofore. All ingredients are mixed at the same time (from an operator's viewpoint). The system also promotes simplified and more efficient cleaning and process control because the system has dedicated handling equipment for each of the calcium source and the acid source, preventing mixing of the sources in the dry state and cross residuals within the equipment.

A schematic example of a preferred embodiment of the system according to the invention is found in FIG. 1. A source tank 10 is shown as representing a flow of NFC juice. If desired, a sample port 11 can be included for analyzing the NFC juice for properties such as Brix, acidity, Brix-to-acid ratio, pH, and other chemical data for the flow into the initial in-line mixer. In this illustrated embodiment, a single upstream in-line mixer 12 is shown. This mixer is of the type discussed herein. FIG. 1 illustrates calcium hydroxide being added through upstream in-line mixer 12.

FIG. 1 further shows a single downstream in-line mixer 13, illustrating the preferred embodiment addition of malic acid at this downstream location. Pressure and temperature gauges, or pressure and temperature monitors, such as illustrated P1, T1, P2 and T2, are provided at locations on the order of those illustrated in FIG. 1. The resulting outflow can be collected in a blend tank or holding tank, as generally illustrated at 14. Continued flow to other operations within an NFC processing plant could instead be provided, depending upon the particular set-up of the processing plant.

It will be appreciated that a system such as that generally illustrated in FIG. 1 also can include pasteurization equipment, either along the sections illustrated, or same could be positioned before or after the portion of the production line that is illustrated in FIG. 1. Often the pasteurizer is located after calcium fortification is made.

A sample port 15 also can be included in order to collect chemical data on the flow after calcium fortification. This typically will include calcium content analysis. Also available for chemical analysis at this stage is the malate content of the calcium-fortified NFC juice and other chemical properties as desired.

The operator need not monitor separate blend times for each of the calcium source and the acid source. This is different from the prior art approach which calls for addition of acids prior to addition of calcium, with a blend time of more than five minutes prior to calcium addition. The present process incorporates both a reversal of the addition order of ingredients and also avoidance of the need for a minimum hold time prior to calcium addition. The process according to the invention allows for shorter blend times, which positively affects operations efficiency. Unexpected acceptable quality characteristics are exhibited by products prepared according to the process. Such are illustrated by the following Examples.

EXAMPLE 1

A batch of orange juice was processed according to the invention. Not-from-concentrate orange juice was made up into a calcium-fortified NFC orange juice, using 1,000 gallons of the NFC orange juice and by means of a recirculation path. More specifically, 1,000 gallons of NFC orange juice were placed into a source tank, 24.3 pounds of calcium hydroxide granules were added to the hopper of in-line mixer 12, and 40.1 pounds of malic acid granules were added to the hopper of in-line mixer 13. Each high shear in-line mixer used in accordance with the invention comprised an APV Triblender providing an approximate range of shear of 96,000 to 120,000 1/sec.

Flow of the orange juice product began, and the hoppers of both mixers were opened at the same time so all solids were dumped into the respective in-line mixers at the same time. The circulation was allowed for one minute, after which the mixers were shut down, and the resulting batch of calcium-fortified NFC orange juice was analyzed and inspected for homogeneity of mixing. The juice was pasteurized in an APV pasteurizer.

Samples were taken and analyzed for Brix (both uncorrected and corrected as generally known in the art), for total acidity, for Brix-to-acid Ratio, for pH, and for calcium content in parts per million (ppm). These results are reported in the Table.

TABLE

| | Sample | | | | | | | |
|---|---|---|---|---|---|---|---|---|
| | 1 | 2 | 3 | 4 | 5 | 6 | 7 | 8 |
| Corrected Brix | 11.53 | 11.8 | 11.82 | 11.82 | 11.83 | 11.88 | 11.85 | 11.8 |
| Total Acidity | 0.54 | 0.55 | 0.55 | 0.55 | 0.55 | 0.55 | 0.55 | 0.55 |
| Ratio (Bar) | 21.34 | 21.45 | 21.49 | 21.49 | 21.51 | 21.6 | 21.54 | 21.45 |
| pH | 4.23 | 4.23 | 4.24 | 4.24 | 4.22 | 4.23 | 4.23 | 4.23 |
| Calcium (ppm) | 1140 | 1520 | 1520 | 1530 | 1540 | 1490 | 1530 | 1530 |

The Table shows that substantial quantities of calcium were incorporated into the juice, indicating a calcium-fortified NFC orange juice. The blending results indicated that the total juice within the tank was 6,231 pounds and the total solids added was 17.4 pounds of calcium hydroxide and 28.7 pounds of malic acid.

The estimated time of calcium hydroxide addition was three seconds, and the estimated calcium hydroxide addition rate was 348 pounds per minute. The estimated time of malic acid addition was 1 second, and the estimated malic acid addition rate was 1722 pounds per minute. The estimated flow rate of juice through the system was 300 gallons per minute, and the pressure was a maximum of 10 psi at the discharge from the downstream in-line mixer. The addition rate for the two powders were estimated due to difficulties in accurately determining the timing in view of the relatively small amount of solids for this test and the rapid speed of incorporation.

Solubility Test

This test measured calcium solubility defined as percent of total juice calcium recovered in the serum of the orange juice sample after high-speed centrifugation. This testing was conducted for three different processes. One was in accordance with the process of U.S. Pat. No. 5,474,793, using a premix of citric and malic acids followed by calcium hydroxide. More specifically, the acid premix was passed through a turbulence zone for incorporation into the NFC orange juice, followed by a delay and then calcium hydroxide addition. Another test was in accordance with the invention, wherein calcium hydroxide was added in the upstream in-line mixer, and malic acid was added in the downstream in-line mixer. The third approach used the same process equipment in accordance with the invention, except the malic acid was added in the upstream in-line mixer, and the calcium hydroxide was added in the downstream in-line mixer.

The calcium solubility was determined to be 95 weight percent by the approach according to the invention. The reverse order of addition (malic acid added first, followed by calcium hydroxide by respective in-line mixers) resulted in a calcium solubility of only 81 percent. When the additions were made in accordance with U.S. Pat. No. 5,474,793, the calcium solubility was 90 percent.

This solubility testing illustrates that the present invention solubilizes calcium very effectively, showing a higher calcium solubility level than that of U.S. Pat. No. 5,474,793. The invention also exhibits far superior solubility compared with when its order of addition by the in-line mixers is reversed (malic acid followed by calcium hydroxide through in-line high-shear mixers) and when malic acid is used, rather than a premix of citric acid and malic acid as in U.S. Pat. No. 5,474,793.

It accordingly is shown that the invention produced or calcium-fortified citrus juice product which is within commercial specifications and which exhibits good solids dispersion and solubility.

Scaling Test

Within a pasteurizer, there is a general need to avoid excessive development of scaling so as to minimize maintenance requirements and downtime for the pasteurizer. Accordingly, the calcium-fortified NFC orange juice made according to the invention was subjected to extended-time pasteurization so as to evaluate the extent of scaling. This test was conducted for over 7 hours. An indication of scaling was measured by a temperature differential, or delta T throughout the testing.

Figure 2:
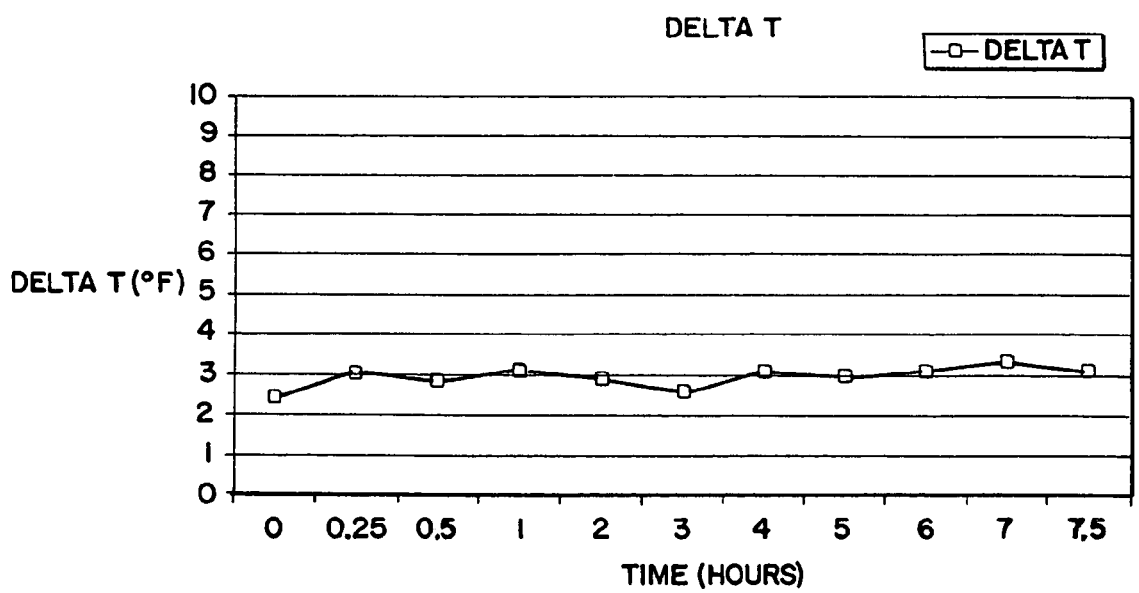
FIG. 2 is a plot of change in temperature over time for pasteurization of products, illustrating control of scale build-up according to the invention.

The results of this testing indicate a substantially consistent delta T, the data being reported in FIG. 2. At the beginning of this test, the delta T was 2.4° F., and at the end of the test, after 7.5 hours, the delta T was still only 3.1° F., with the highest delta T value being at 7 hours, only 3.3° F. The conclusion is that this pasteurizer scaling test showed no significant impact in 7.5 hours.

EXAMPLE 2

Sensory testing was carried out on calcium-fortified juices. The test used the NFC orange juice prepared in accordance with the invention as described in Example 1. The acidifier was 100 percent malic acid, with no added citric acid. Comparative testing was carried out on NFC orange juice prepared in accordance with U.S. Pat. No. 5,474,793, using a citric and malic acid premix, followed by calcium hydroxide addition.

Informal discrimination sensory analysis was carried out by untrained panelists. This indicated that the two calcium-fortified NFC juices were not similar, with comments suggesting that the juice according to the prior patent was more flavorful. However, when these same juices were subjected to more objective and formal descriptive sensory analysis by trained panelists, the results were different. These more objective and more reliable tests demonstrated that there were no flavor differences in the major orange sensory characteristics. These descriptive sensory analysis characteristics are identified as "total orange", "raw", "cooked", "expressed oil" and "candy/artificial" characteristics. In addition, the juice prepared according to the invention was significantly lower in two off-flavor descriptive sensory analysis characteristics. These are "metallic package notes" and "bitterness" characteristics. These negative characteristics where significantly lower when compared with those of juice prepared by the process of the U.S. Pat. No. 5,474,793.

Based upon this informal and formal testing, the overall sensory conclusion is that the invention produces a calcium-fortified juice which is acceptable in terms of sensory performance and has the advantage of significantly lower off-flavors noted above. The resulting less harsh-flavored juice according to the invention indicates that an acceptable product is produced, especially if it were to be augmented by a flavor-addback system, which is an approach used in the industry, to the extent that the total orange flavor might be improved if in fact the informal discrimination sensory analysis indicates flavor addback addition is desirable.

EXAMPLE 3

Solubility testing was carried out as noted in Example 1. Tests were run wherein the calcium addition according to the invention was followed by addition of a variety of food-grade acids in-line to the calcium-containing juice. Using phosphoric acid gave a calcium solubility of 91 percent. Fumaric acid gave a calcium solubility of 94 percent. Adipic acid gave a calcium solubility of 92 percent. Benzoic acid gave a calcium solubility of 92 percent. Each shows that high solubility (in excess of 90 percent) is achieved when the invention is followed.

EXAMPLE 4

Calcium solubility was tested over time after making calcium-fortified juice according to the invention. Calcium-fortified NFC orange juice was made up with four different levels of calcium as formulated. One added 0.46 weight percent malic acid after calcium hydroxide addition so as to incorporate 0.15 weight percent calcium (1500 ppm). Another incorporated 0.27 weight percent calcium (2700 ppm), using 0.82 weight percent malic acid. A third incorporated 0.42 weight percent calcium (4200 ppm), using 1.27 weight percent malic acid, and the fourth incorporated 0.5 weight percent (5000 ppm) calcium, using 1.55 weight percent malic acid after calcium addition.

Figure 3:
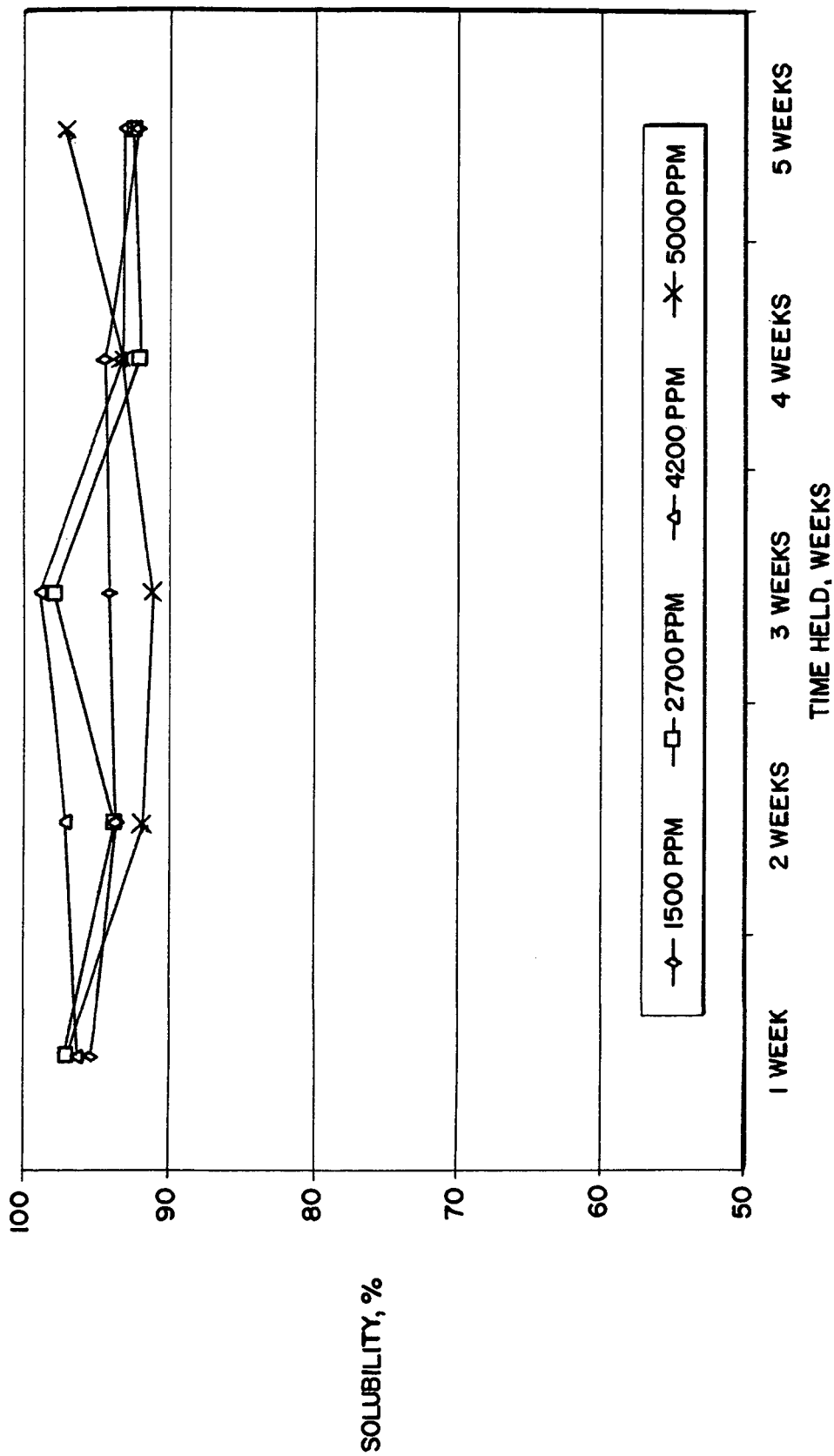
FIG. 3 is a plot of solubility over time of calcium in calcium-fortified NFC orange juice with varying calcium concentrations.

Each juice sample was pasteurized, filled into HDPE bottles and held refrigerated at 35° F. for 5 weeks. Each was evaluated at the end of each week. The results, which are plotted in FIG. 3, illustrate that calcium stability remains high (above 90 percent) throughout the 5 weeks, even for the very high level of 0.5 weight percent calcium. This represents an NFC orange juice having about 120 percent Daily Value, per 240 mL serving, of calcium and which is able to retain excellent calcium solubility for a long period of time. The 0.42 weight percent calcium represents about 100.8 percent of DV, while the 0.27 weight percent calcium represents about 64.8 percent DV, and the 0.15 weight percent calcium represents about 36 percent of DV. Taste remains satisfactory, even at these higher DV levels.

EXAMPLE 5

To a not-from-concentrate orange juice is added calcium hydroxide at a level of 2.9 grams per liter and 0.4 weight percent of phosphoric acid (85 volume to volume percent). The resulting calcium-fortified NFC orange juice contains soluble calcium that is easily absorbed by the body, contributes no appreciable flavor to the juice, and exhibits improved processing functionality. This orange juice exhibits a similar flavor profile as NFC orange juice fortified with CCM.

EXAMPLE 6

Calcium hydroxide at 2.9 grams per liter, 2.4 grams per liter of malic acid and 0.14 weight percent of phosphoric acid (85 volume to volume percent) are mixed into not-from-concentrate orange juice. Same has properties as noted in Example 5. Calcium solubility is similar to that of CCM, but overall costs of ingredients are lower.

EXAMPLE 7

To NFC orange juice is added 2.9 grams per liter of calcium hydroxide and 4.8 grams per liter of malic acid. A calcium fortified NFC juice is provided which is superior to CCM in solubility of the calcium complex and is less fouling of pasteurizing equipment.

It will be understood that the embodiments of the present invention which have been described are illustrative of some of the applications of the principles of the present invention. Numerous modifications may be made by those skilled in the art without departing from the true spirit and scope of the invention, including those combinations of features that are individually disclosed or claimed herein.

The invention claimed is:

1. A process for fortifying a fruit juice beverage with calcium, comprising:
   providing a supply of fruit juice as a flow of juice;
   supply a calcium source into said flow of juice, said supplying being from an upstream in-line mixer along the flow of juice, whereby calcium is incorporated into the flow of juice to provide a calcium-augmented flow of juice;
   supplying a food-grade acid source from a downstream in-line mixer along the flow of juice, the downstream mixer being spaced from the upstream in-line mixer, whereby acid is incorporated into the calcium-augmented flow of juice to form a calcium-fortified flow of juice having a component of calcium and acid; and
   collecting the calcium-fortified flow of juice as a calcium-fortified fruit juice beverage.

2. The process in accordance with claim 1, wherein said calcium source is selected from the group consisting of calcium hydroxide, calcium carbonate, calcium citrate, calcium phosphate, calcium chloride, calcium malate and combinations thereof, and wherein said acid source is selected from the group consisting of malic acid, phosphoric acid, adipic acid, fumaric acid, benzoic acid, gluconic acid, lactic acid, and combinations thereof.

3. The process in accordance with claim 2, wherein during said supplying of the acid source, citric acid is not introduced into the flow of juice.

4. The process in accordance with claim 2, wherein said supplying of the acid source into the flow of juice results in the calcium-fortified juice beverage having between about 0.02 and about 0.25 weight percent of acid, based on the total weight of calcium-fortified juice beverage.

5. The process in accordance with claim 2, wherein said supplying of the acid source into the flow of juice results in the calcium-fortified juice beverage having between about 0.06 and about 0.8 weight percent of acid, based on the total weight of calcium-fortified juice beverage.

6. The process in accordance with claim 1, wherein said calcium source is calcium hydroxide.

7. The process in accordance with claim 6, wherein said acid source is malic acid.

8. The process in accordance with claim 7, wherein during said supplying of the acid source, citric acid is not introduced into the flow of juice.

9. The process in accordance with claim 7, wherein said supplying provides the calcium source and said acid source at a weight ratio of between about 1:2.7 calcium to acid and about 1:3.3 calcium to acid.

10. The process in accordance with claim 1, wherein said acid source is malic acid.

11. The process in accordance with claim 1, wherein said acid source is phosphoric acid.

12. The process in accordance with claim 1, wherein said acid source is a combination of malic acid and phosphoric acid.

13. The process in accordance with claim 1, wherein the component of calcium and acid comprises calcium malate.

14. The process in accordance with claim 1, wherein said supplying of a calcium source and said supplying of an acid source occur at substantially the same time into the flow of juice but at different locations along the flow of juice.

15. The process in accordance with claim 1, wherein said supplying of the acid source is initiated along the flow of juice within five minutes after initiation of said supplying of the calcium source along the flow of juice.

16. The process in accordance with claim 1, wherein during said supplying of the acid source, citric acid is not introduced into the flow of juice.

17. The process in accordance with claim 1, wherein said flow of juice is at a flow rate of between about 150 and about 400 gallons per minute of juice.

18. The process in accordance with claim 1, wherein said supplying provides the calcium source and said acid source at a weight ratio of between about 1:2.7 calcium to acid and about 1:3.3 calcium to acid.

19. The process in accordance with claim 1, wherein said supplying of the calcium source and said supplying of the acid source each are accomplished under high-shear mixing conditions.

20. A process for fortifying a not-from-concentrate (NFC) juice with calcium, comprising:
    providing a supply of not-from-concentrate juice as a flow of NFC juice;
    supplying a calcium source into said flow of NFC juice, said supplying being from an upstream in-line mixer along the flow of NFC juice, whereby calcium is incorporated into the flow of NFC juice in order to provide a calcium-augmented flow of NFC juice;
    supplying a food-grade acid source from a downstream in-line mixer along the flow of juice, the downstream mixer being spaced from the upstream in-line mixer, whereby food-grade acid is incorporated into the calcium-augmented flow of NFC juice to form a calcium-fortified flow of NFC juice having a combination of calcium and malate; and
    collecting the calcium-fortified flow of juice as a calcium-fortified NFC juice.

21. The process in accordance with claim 20, wherein said supplying of a calcium source and said supplying of an acid source occur at substantially the same time into the flow of juice but at different locations along the flow of juice.

22. The process in accordance with claim 20, wherein said supplying of an acid source is initiated along the flow of juice within five minutes after initiation of said supplying of the calcium source along the flow of juice.

23. The process in accordance with claim 20, wherein during said supplying of the acid source, citric acid is not introduced into the flow of juice.

24. The process in accordance with claim 20, wherein said supplying of the calcium source into the flow of juice results in the calcium-fortified juice beverage having between about 0.02 and about 0.25 weight percent of calcium, based on the total weight of calcium-fortified juice beverage; wherein said supplying of the acid source into the flow of juice results in the calcium-fortified juice beverage having between about 0.06 and about 0.8 weight percent of acid, based on the total weight of calcium-fortified juice beverage; and wherein said flow of NFC citrus juice is at a flow rate of between about 150 and about 400 gallons per minute of juice.

25. A process for fortifying a not-from-concentrate (NFC) citrus juice with calcium, comprising:
    providing a supply of not-from-concentrate citrus juice as a flow of NFC citrus juice;
    supplying a calcium source into said flow of NFC citrus juice, said supplying being from an upstream in-line mixer along the flow of NFC citrus juice, whereby calcium is incorporated into the flow of NFC citrus juice under high-shear mixing conditions in order to provide a calcium-augmented flow of citrus juice;
    supplying a source of organic acid selected from a malic acid source, a phosphoric acid source, and combinations of said sources from a downstream in-line mixer along the flow of citrus juice, the downstream mixer being spaced from the upstream in-line mixer, whereby the source of organic acid is incorporated into the calcium-augmented flow of citrus juice under high-shear mixing to form a calcium-fortified flow of citrus juice having a combination of calcium and malate, calcium and phosphate, calcium malate phosphate, or both calcium malate and calcium phosphate;
    collecting the calcium-fortified flow of citrus juice as a calcium-fortified NFC citrus juice; and
    wherein said supplying of a calcium source and said supplying of an acid source occur at substantially the same time into the flow of juice but at different locations along the flow of juice.

26. The process in accordance with claim 25, wherein said supplying of the acid source is initiated along the flow of juice within five minutes after initiation of said supplying of the calcium source along the flow of juice.

27. The process in accordance with claim 25, wherein during said supplying of the acid, source, citric acid is not introduced into the flow of juice.

28. The process in accordance with claim 25, wherein said supplying of the calcium source of juice results in the calcium-fortified juice beverage having between about 0.02 and about 0.25 weight percent of calcium, based on the total weight fortified juice beverage; and wherein said supplying of the acid source the flow of juice results in the calcium-fortified juice beverage having between about 0.06 and about 0.8 weight percent of acid, based on the total weight of calcium-fortified juice beverage.

* * * * *